United States Patent [19]

Yoshio

[11] 4,375,092
[45] Feb. 22, 1983

[54] AUTOMATIC MUSIC SELECTING DEVICE

[75] Inventor: Junichi Yoshio, Tokorozawa, Japan

[73] Assignee: Pioneer Electronic Corporation, Tokyo, Japan

[21] Appl. No.: 283,855

[22] Filed: Jul. 16, 1981

[30] Foreign Application Priority Data

Jul. 17, 1980 [JP] Japan ............................. 55-96870
Sep. 24, 1980 [JP] Japan ............................. 55-131499

[51] Int. Cl.³ .................... G11B 3/38; G11B 17/06
[52] U.S. Cl. ................................. 369/41; 369/33; 369/217; 369/225; 369/231
[58] Field of Search ................... 369/33, 41, 216, 217, 369/231, 225, 226

[56] References Cited

U.S. PATENT DOCUMENTS 3,937,903  2/1976  Osann ............................. 369/41
4,142,729  3/1979  McLennan ..................... 369/33
4,166,621  9/1979  Isaacson et al. ............... 369/33

Primary Examiner—Steven L. Stephan
Attorney, Agent, or Firm—Sughrue, Mion, Zinn, Macpeak and Seas

[57] ABSTRACT

An automatic music selecting device in which a pickup cartridge is accurately lowered onto a disc at an intermediate position between adjacent songs on the disc even if the disc is eccentric. An intersong sensor mounted on the pickup cartridge detects the intersong intervals upon movement of the arm. The arm is stopped at a predetermined interval designated by an externally supplied song number. To do this, the output signal from the intersong sensor is held corresponding to the position just before the arm is stopped. Then, the position of the arm is finely adjusted on the basis of the difference between the level of the output signal thereafter produced by the sensor and the held level.

4 Claims, 13 Drawing Figures

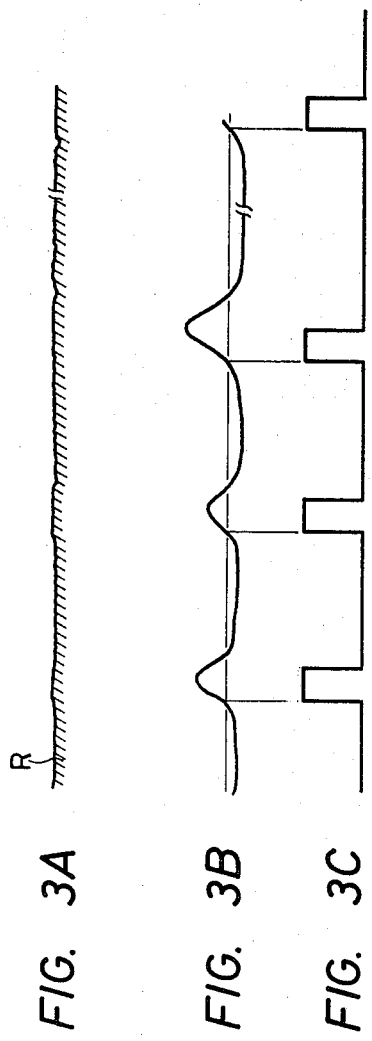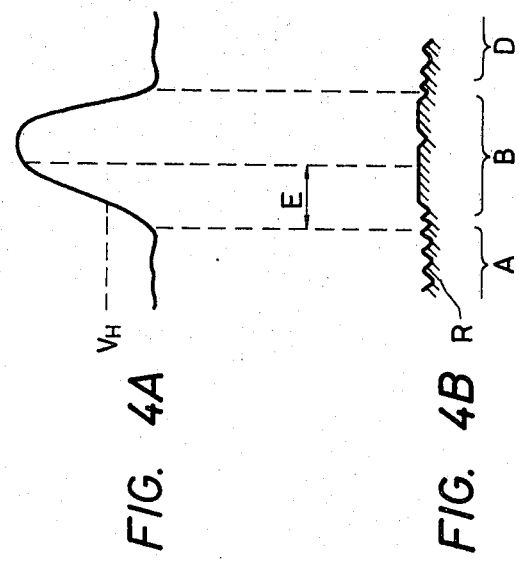

AUTOMATIC MUSIC SELECTING DEVICE

BACKGROUND OF THE INVENTION

The present invention relates to an automatic music or song selecting device. More particularly, the invention relates to improvements in an automatic music or song selecting device for automatically selecting any arbitrary music or song of two or more recorded on one side surface of a recording disc.

In such a conventional automatic music or song selecting device, a pickup cartridge incorporates an intermusic or intersong sensor having a light source and a photodetector and which is mounted in the vicinity of the tip of the stylus of the cartridge. When the pickup cartridge thus constructed is moved along the surface of the recording disc together with the intermusic sensor, light emitted from the light source and reflected by the surface of the recording disc is detected by the photodetector. The intermusic or intersong sensor of the photodetector thus detects the space or interval between adjacent music or songs on the recording disc on the basis of variations in the light reflected from the recording disc and accordingly produces an output signal varying in magnitude in accordance with the variations of the light reflected from the recording disc.

When the counted number of spaces between the adjacent songs on the recording disc coincides with the number of songs designated externally, the movement of the pickup cartridge arm is suspended. The pickup cartridge is thereafter lowered onto the recording disc and the song thus designated will be subsequently reproduced on the recording disc.

The arm however tends to move past the position where it is stopped due to the momemtum of the arm and to characteristics of the drive unit for the arm. To compensate for this, a certain conventional automatic music selecting device has been constructed in which the arm is over a short distance in a reverse direction upon suspension of the movement of the arm so as to reduce the error in the positioning of the cartridge.

Since the recording disc is rotating when the intermusic sensor detects intermediate spaces between adjacent songs on the recording disc as described above in any of the prior automatic music selecting devices, the tip of the stylus of the pickup cartridge disposed at an intermediate position between adjacent songs at the time of detecting the intermediate space therebetween will not be correctly located at the intermediate space between the adjacent songs on the recoding disc but will be longitudinally displaced back and forth when the stylus is actually lowered onto the surface of the recording disc if the disc has an eccentric center, for instance. This is disadvantageous in that the tip of the stylus will then be lowered onto the disc of the last part of the previous song or at the initial part of the desired song so that the music will start from the last part of the previous song or from a point into the desired song to be next reproduced.

More specifically, the conventional automatic music selecting device has a drawback due to eccentricity of the recording disc. If the eccentricity of the disc exceeds the length of the intermediate space between adjacent songs, the pickup cartridge cannot in principle be lowered accurately at the desired intermediate position between adjacent songs on the recording disc.

In order to eliminate the above-described drawbacks of the conventional automatic music selecting device and to provide a device capable of accurately lowering the tip of the stylus onto a disc at a correct intermediate position between the adjacent songs on the recording disc, even if the disc is eccentric, an improved automatic music selecting device has been proposed in which an output signal level from an intermusic sensor is stored when movement of the arm is stopped upon selection of a desired song on the recording disc, the output signal level thus stored is compared with an output signal level obtained thereafter from the same intermusic sensor, and the position of the arm is finely adjusted on the basis of the compared result.

If there is a displacement of the position between the tip of the stylus and the intermusic sensor, even if the position of the arm is finely adjusted as described above so that the position of the intermusic sensor is corrected, the tip of the stylus will still be lowered away from the intermediate position between adjacent songs.

In order to further correct the displacement of the intermusic sensor thus lowered, a mechanical correcting mechanism has been provided at the intermusic sensor so as to finely adjust the position of the tip of the stylus of the cartridge with respect to the intermusic sensor. This correcting mechanism further exhibits other disadvantages and drawbacks in that a complicated mechanical structure must be provided at the cartridge and adjustment of the stylus must be made at the end of the cartridge. Such an adjustment is intricate and requires a large number of steps.

Accordingly, a primary object of the invention is to provide an automatic music selecting device in which a pickup cartridge can be accurately lowered onto a disc at an intermediate position between adjacent songs on the disc, even if the disc is eccentric.

The nature, principle and utility of the invention will become more apparent from the following description when read in conjunction with the accompanying drawings.

SUMMARY OF THE INVENTION

In accordance with this and other objects of the invention, there is provided an automatic music selecting device including an intersong sensor mounted on a pickup cartridge mounted on an arm for detecting intervals between adjacent songs on a recording disc upon movement of the arm, means responsive to a number on the recording disc of a song externally designated for stopping the arm at a predetermined interval between selected songs on the recording disc, means for holding the level of an output signal from the intersong sensor before the arm is stopped, and means for finely adjusting the position of the arm on the basis of a difference between the level of the output signal thereafter produced by the sensor and the level held by the level holding means, thereby disposing the arm in a predetermined intermediate position on the recording disc corresponding to the held level. The position of the arm on the recording disc may be finely adjusted on the basis of a comparison result between the held level of the level holding means and the level of the output signal thereafter produced.

BRIEF DESCRIPTION OF THE DRAWINGS

In the accompanying drawings:

FIGS. 3A through 3C are graphical representations indicating the surface of the recording disc, an output signal from an intermusic sensor moved along the surface of the disc and a signal processed from the output of the intermusic sensor;

FIGS. 4A and 4B are graphical representations for explaining the operation of an intermusic servo unit employed in the invention;

DESCRIPTION OF THE PREFERRED EMBODIMENTS

Figure 1:
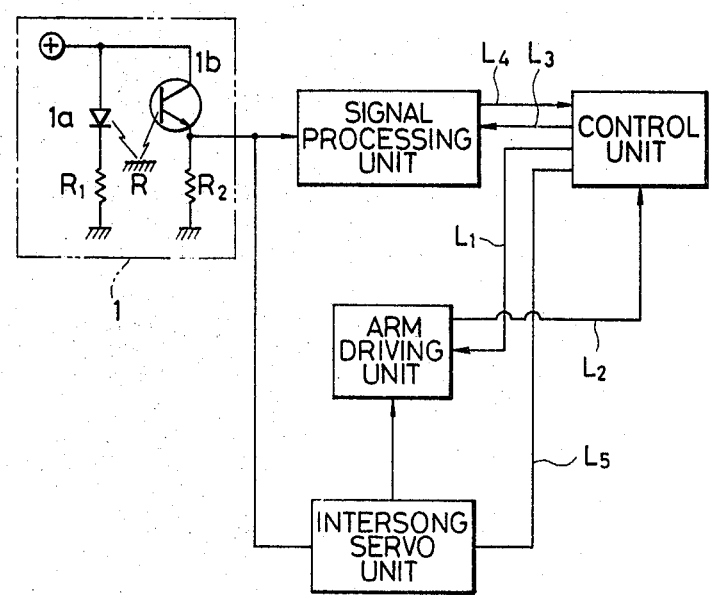
FIG. 1 is a block diagram showing a preferred embodiment of an automatic music selecting device constructed according to the present invention.

A first preferred embodiment of an automatic music or song selecting device according to the invention is shown in FIG. 1 in which like reference numerals designated the same components in the other figures. In FIG. 1, the automatic music selecting device of the invention includes an intermusic or intersong sensor 1.

The sensor 1 includes a resistor $R_1$ connected at one end to ground, a light emitting diode 1a as a light source connected at one end to the other end of the resistor $R_1$ and at the other to a positive terminal of a power source, another resistor $R_2$ connected at one end to ground, and a phototransistor 1b as a photodetector connected at one end to the other end of the resistor $R_2$ and at the other end to the positive terminal of the power source. Light emitted from the diode 1a is directed onto the recording disc R and is reflected from the disc R. The reflected light is applied to the phototransistor 1b which produces an output signal varying in accordance with the amount of light thus received. The output from the phototransistor 1b is applied from the connecting point between the phototransistor 1b and the resistor $R_2$. The output signal from the phototransistor 1b varies, as indicated in FIG. 3B, in correspondence to the presence or absence of a modulated groove on the recording disc shown in cross section in FIG. 3A.

The automatic music selecting device of this embodiment of the invention further includes a signal processing unit 2, an arm driving unit 3, a logic control unit or circuit 4, and an intermusic or intersong servo unit 5 which form a selecting device together with the intersong sensor 1.

The output signal from the intermusic sensor 1 is in turn applied to an input of the signal processing unit 2, which sequentially processes the output signal and generates a pulse waveform signal as indicated in FIG. 3C in response to the output signal from the sensor 1 when the output signal from the sensor 1 becomes higher than a predetermined level to thus indicate the detection of an intermediate space between adjacent songs on the recording disc R.

The pulse signal from the signal processing unit 2 is in turn applied to one input of a logic control unit 4. The logic control unit 4 stores the number of the desired designated music or song.

The output signal from the intersong sensor 1 is also applied to one input of an intermusic servo unit 5 which operates, as will be described hereinafter in greater detail, to control the arm driving unit 3.

The arm driving unit 3 serves to drive the arm such that the tip of the stylus of the pickup cortridge having the intermusic sensor 1 is lowered by moving the cartridge along the surface of the recording disc when leading in the cartridge to the music on the disc to the intermediate groove between a previous song and a desired song on the recording disc in response to the detection of an intermediate position or space.

The number of a song designated externally is applied to another input of the logic control unit 4 which stores the number of the designated song. Further, the pulse signal from the signal processing unit 2 is also applied to the input of the logic control unit 4 as described above, and an arm position or state signal is applied to the other input of the logic control unit 4 from the arm driving unit 3. The logic control unit 4 thus serves to control the signal processing unit, the arm driving unit 3 and the intermusic servo unit 5 with outputs therefrom, as will be hereinafter described in greater detail.

The output from the logic control unit 4 is applied to the other input of the intermusic servo unit 5 as described above. The unit 5 serves to store the output signal level from the intersong sensor 1 upon reception of a signal from the logic control unit 4 when the arm has moved to the desired music on the recording disc and is stopped at an intermediate position between a previous song and a desired song and to thereafter compare the output signal level from the intersong sensor 1 with the stored level thereby operating the arm driving unit 3 so that the arm is held over the intermediate position between the adjacent songs corresponding to the stored level on the recording disc.

Figure 2:
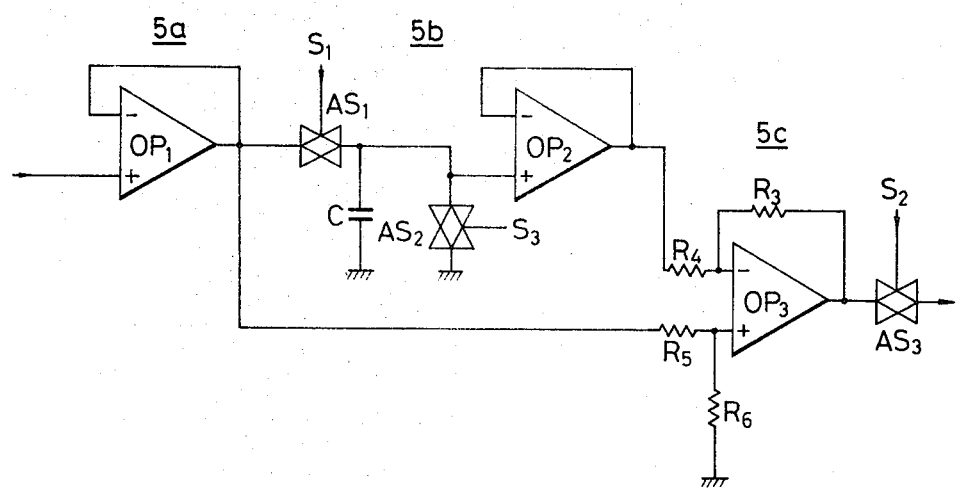
FIG. 2 is a circuit diagram showing a preferred embodiment of an automatic music selecting device of the invention.

The intersong servo unit 5 is constructed as indicated in FIG. 2. In FIG. 2, the pulse signal from the intersong sensor 1 is applied to the non-inverting input of a buffer amplifier 5a (operational amplifier $OP_1$) which sequentially produces a signal output having a waveform similar to the pulse signal from the sensor 1. The output from the amplifier 5a is in turn applied to the input of a voltage holding unit 5b which includes analog switches $AS_1$ and $AS_2$, a capacitor C and an operational amplifier $OP_2$. The pulse output signal from the buffer amplifier 5a is applied to one input of the analog switch $AS_1$, which is of a normally closed type. Thus, the capacitor C charged through the conducting analog switch $AS_1$ is retained at the charged level. The charged level at the capacitor C is applied to in turn to the input of the analog switch $AS_2$ and to the non-inverting input of the operational amplifier $OP_2$ which sequentially produces a signal corresponding to the charged level of the capacitor C. It is noted that the charged level at the capacitor C corresponds to the output signal level of the intersong sensor 1 when the analog switch $AS_1$ is turned off.

The output from the voltage holding unit 5b is applied to the inverting input of the operational amplifier $OP_2$ through a resistor $R_4$. The pulse output signal from the buffer amplifier 5a is further applied to the non-inverting input of the operational amplifier $OP_3$ through a resistor $R_4$. The amplifier $OP_3$ thus forms a differential amplifier 5c together with resistors $R_3$ through $R_6$, which amplifier 5c serves to compare in magnitude the output from the operational amplifier $OP_1$ with the output from the buffer amplifier $OP_2$ to produce a differential signal corresponding to the difference between the output from the operational amplifier OP$_1$ and the output from the buffer amplifier 5a. The differential signal is applied through the analog switch AS$_3$ to the arm driving unit 3.

The operation of the intersong servo unit 5 thus constructed will be described.

When information such as the number of a song designated externally is stored in the logic control unit 4 and the automatic music selecting device is then set in a start mode for selecting the song of the designated number, an output signal is applied through a signal line L$_2$ from the logic control unit 4 to the arm driving unit 3 to move the arm to the song thus designated on the recording disc. At the starting time, when the fact that the arm is not confronting the recording disc is indicated by a signal on the line L$_2$, a signal is applied through the signal line L$_3$ to set the signal processing unit 2 to the inoperative state unit 1 the arm has passed through the portion where no modulated groove is present on the outer periphery of the recording disc. This prevents the intermusic sensor 1 from being erroneously operated by an external perturbation when the sensor 1 does not confront the recording disc.

When the arm has passed through the portion where no modulated groove exists on the outer periphery of the recording disc, the logic control unit 4 will count "1" and will thus release the inoperative state of the signal processing unit 2. Thereafter, the pulse signal produced on the signal line L$_4$ of the output from the signal processing unit 2 is counted as indicated in FIG. 3C with one pulse being counted every time that the intersong sensor 1 reaches an intersong intermediate position between adjacent songs on the recording disc. When the counted content thus reaches the number of the desired song stored as described above, a signal is fed through the signal line L$_1$ to the arm driving unit 3 so as to thereby stop the movement of the arm.

The logic control unit 4 further applies signals S$_1$ and S$_2$ through the signal lines L$_5$. The signal S$_2$ from the control unit 4 is applied to the analog switch AS$_3$ of the intersong servo unit 5 so that the voltage level V$_H$ of the output signal from the intersong sensor 1 at this time is held by the capacitor C, thereby turning the analog switch AS$_1$ off as indicated in FIG. 4A. Simultaneously, the signal from the control unit 4 is also applied to the analog switch AS$_3$ of the intersong servo unit 5, and the output from the differential amplifier 5c is applied through the analog switch AS$_3$ to the arm driving unit 3, thereby turning the analog switch AS$_3$ on so that the output signal from the amplifier 5c is applied through the analog switch AS$_2$ to the arm driving unit 3.

The output signal thus produced from the differential amplifier 5c corresponds to the difference between the voltage V$_H$ held by the voltage holding unit 5b and the output signal voltage of the intersong sensor 1 after the arm has stopped moving. If the record has no eccentricity, the differential signal thus produced is zero. However, if the disc has some eccentricity, the signal voltage becomes positive or negative in accordance with the state of the eccentricity. When such positive or negative voltage signal is applied to the arm driving unit 3, the arm driving unit 3 will finely adjust the arm forwardly or reversely so that the output signal level from the intersong sensor 1 becomes coincident with the held voltage level. Accordingly, when the arm is lowered after the desired song has been selected, the tip of the stylus of the pickup cartridge will be brought into a correct position at a predetermined intermediate position between adjacent song tracks.

It is noted that the output signal from the intersong sensor 1 has a waveform with a peak in the vicinity of the center in the intermediate space B between the modulated grooves A and D of the recording disc R as indicated in FIGS. 4A and 4B. Accordingly, the voltage level substantially at the center of the linear line at the rise of the peak of the waveform is set for the held voltage level V$_H$ of the voltage holding unit 5b, and the range E of the linear portion is utilized as an intersong servo region. It is also noted that the linear portion of the falling side of the waveform can also be utilized as the intersong servo region.

When the music or song thus selected has been completely played so that the intermusic sensor 1 is then introduced into the intermediate space or position between this song and the next song on the disc, the intermediate position is detected by the intersong sensor 1, which produces a pulse output signal to the signal processing unit 2.

When the pulse signal from the sensor 1 is received at the signal processing unit 2, the corresponding pulse signal is sequentially produced from the signal processing unit 2 through the signal line L$_4$ to the logic control unit 4. When the logic control unit 4 thus receives the pulse signal, the control unit 4 counts the pulses thereof. If the number of pulses thus counted in the control unit 4 is not coincident with the number of the music or song externally designated, the control unit 4 will apply a signal for driving the arm to its rest position through the signal line L$_1$ to the arm driving unit 3.

Simultaneously, the logic control unit 4 further applies the signal S$_1$ (in FIG. 2) to the other input of the analog switch AS$_2$ by way of the signal lines L$_5$. When the signal S$_1$ is thus applied to the analog switch AS$_2$, the switch AS$_2$ is turned on. The capacitor C is then discharged through the switch AS$_2$ closed, thus preparing for the next operation.

In addition to the above configuration of the intersong servo unit 5, a low pass filter (L.P.F.) may be connected to the input of the servo unit 5 shown in FIG. 2 for cutting out high frequency noise having mixed with the output from the intersong sensor 1 which might otherwise be present dur to dust or dirt or the like on the recording disc.

Further, the pulse output signal from the intersong sensor 1 may also be digitally converted from analog form in the intersong servo unit 5 shown in FIG. 2 and the pulse signal thus digitally converted may be digitally processed by a microcomputer or the like to thereby generate a servo signal to the arm driving unit 3 using ordinary digital techniques.

Moreover, it may be appreciated that the arm lifting mechanism to be employed is constructed so as to transmit a rotary force directly to a vertical rotary shaft so as to raise and lower the arm without significant friction when the intersong servo unit 5 causes the arm driving unit 3 to drive the arm. However, the arm lifting mechanism is not limited to this configuration. Any ordinary device for raising the arm having a lifting seat and a lifting stand for lifting the arm with little friction between the arm and the lifting seat may be used as well.

It may be appreciated from the foregoing description that since in the automatic music selecting device of the invention the output signal level from the intersong sensor is held upon stopping of the arm on which the sensor is mounted and the arm position is further finely adjusted on the basis of the difference between the signal level thus held and the output signal level thereafter produced by the sensor so as to maintain the arm at a predetermined intermediate space between the previous song and a song to be reproduced, the arm will not be displaced from the predetermined intermediate position, even if the disc being played is eccentric, when the arm is lowered, as frequently occurred in the conventional automatic music selecting device.

Figure 5:
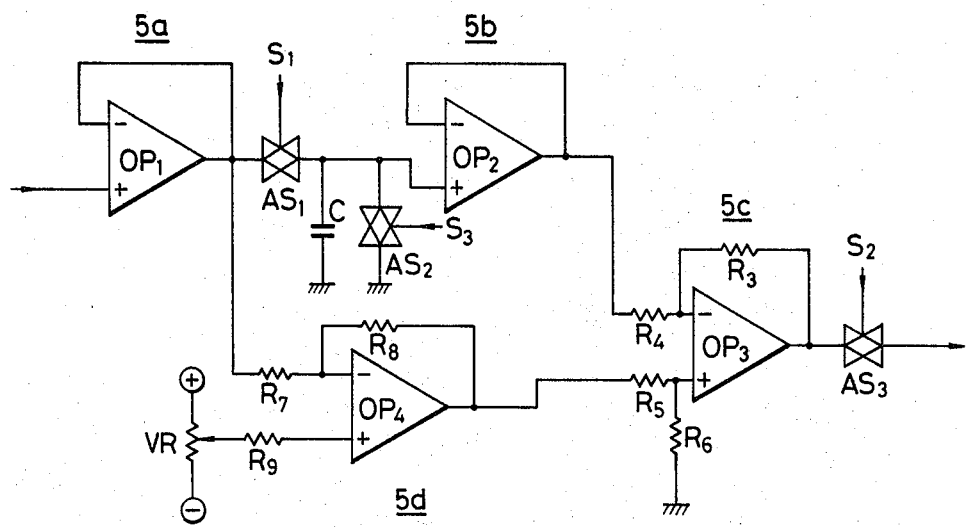
FIG. 5 is a view similar to FIG. 2 but showing another preferred embodiment of an automatic music selecting device of the invention.

Another preferred embodiment of an automatic music selecting device constructed according to the invention will be described in detail with reference to FIG. 5, wherein like reference numerals in FIG. 5 designate the same or equivalent parts and components in FIGS. 1 and 2. In FIG. 5, the only difference between the first embodiment and the second embodiment is that the intermusic servo unit 5 shown in FIG. 5 additionally includes a level shifting unit or circuit 5d which is connected between the buffer amplifier 5a and the differential amplifier 5c.

The level shifting circuit 5d includes input resistors $R_7$ and $R_9$, a feedback resistor $R_8$, an operational amplifier $OP_4$ and a variable resistor VR. The pulse signal from the operational amplifier $OP_1$ of the buffer amplifier 5a is applied through the resistor $R_7$ to the inverting input of the operational amplifier $OP_4$. A voltage determined by the setting of the movable contact of the variable resistor VR, which is connected at the fixed contacts to respective positive and negative terminals of a power source, is applied through the resistor $R_9$ to the non-inverting input of the operational amplifier $OP_4$. The voltage at the movable contact of the resistor VR may be determined from the positive to negative voltages as will be hereinafter described in greater detail.

The operation of the intersong servo unit 5 of the automatic music selecting device of this embodiment will be described.

When the arm on which the intermusic sensor 1 is mounted is introduced to the predetermined intermediate position in the space between a previous music song and a song to be next reproduced, the logic control unit 4 counts "1", as described above with respect to the first embodiment, upon reception of a pulse signal from the sensor 1 through the signal processing unit 2. When the counted value counted by the logic control unit 4 reaches the number of the songs previously stored as described above with reference to the first embodiment, a signal is sent through the signal line $L_1$ to the arm driving unit 3 to stop the movement of the arm, in the same manner as in the first embodiment.

The logic control unit 4 thus further applies a signal $S_2$ by way of the signal lines $L_5$ to the analog switch $AS_2$ of the intersong servo unit 5 and the output from the differential amplifier 5c is also applied to the analog switch $AS_3$, thereby turning the analog switch $AS_3$ on.

When the analog switch $AS_3$ is thus turned on, the voltage held by the voltage holding unit 5b is applied to the inverting input of the operational amplifier $OP_3$ of the differential amplifier 5c and the output signal voltage of the intersong sensor 1 as the arm is stopped is applied through the level shifting unit 5d and the resistor $R_5$ to the non-inverting input of the operational amplifier $OP_3$ of the differential amplifier 5c. Thus, the differential amplifier 5c produces a signal having a magnitude corresponding to the voltage difference between the held voltage from the voltage holding unit 5b and the signal voltage of the sensor 1 through the level shifting unit 5d, as will be hereinafter described in more detail.

When the variable resistor VR in the level shifting unit 5d is set to produce a zero voltage at the movable contact, the zero voltage thus set applied through the resistor $R_9$ to non-inverting input of the operational amplifier $OP_4$ of the level shifting unit 5d causes the level shifting unit 5d to produce an output signal from the intersong sensor 1 without being shifting in level. Accordingly, if there is no eccentricity, the zero voltage is applied from the level shifting unit 5d to the non-inverting input of the operational amplifier $OP_3$ of the differential amplifier 5c. The differential amplifier 5 will then produce a zero voltage output signal and accordingly the intersong servo unit 5 will thus produce no voltage output to the arm driving unit 3. Consequently, the arm will not be finely adjusted by the arm driving unit 3 but will be merely lowered from its stopped position. The tip of the stylus of the pickup cartridge will then directly be brought into contact with a predetermined intermediate position in the space between the previous song and a song to be next played. At this time no displacement is present between the intersong sensor 1 and the tip of the stylus of the pickup cartridge.

If, on the other hand, the disc has some eccentricity, the magnitude of the output signal from the intersong sensor 1 will vary while the arm is being lowered. The signal thus varied is in turn applied from the sensor 1 to the inverting input of the operational amplifier $OP_4$. Thus, a signal is in turn applied from the operational amplifier $OP_4$ to the noninverting input of the operational amplifier $OP_3$ of the differential amplifier 5c. Hence, there then exists a difference between the applied signal and the held voltage $V_H$ applied to the inverting input of the differential amplifier 5c. The differential amplifier 5c then produces a signal having a magnitude corresponding to the difference and polarity therebetween determined by the direction of displacement of the stylus along the modulated groove on the recording disc.

The signal thus applied from the intersong servo unit 5 to the arm driving unit 3 causes the arm to be finely driven by the arm driving unit 3 in the direction determined by the polarity of the signal thus applied until the output signal level from the intersong sensor 1 is coincident with the held voltage $V_H$ from the voltage holding unit 5b. As a consequence, the tip of the stylus of the pickup cartridge is thus lowered to a correct intermediate position in the space between the previous song and a song to be next reproduced upon contact with the surface of the recording disc.

The operation of the arm incorporating the pickup cartridge provided with the intersong sensor 1 will be described in more detail with reference to FIG. 6A.

Figure 6A:
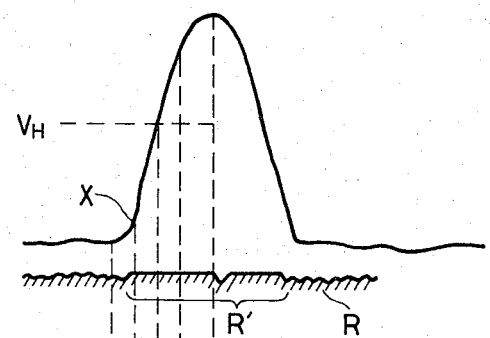
FIGS. 6A and 6B are graphical representations similar to FIGS. 4A and 4B but showing another example of the intermusic servo unit employed.

When the intersong sensor 1 mounted on the pickup cartridge of the arm passes the intermediate space portion R' on the recording disc R, the sensor 1 produces an output signal having a peak in the vicinity of the intermediate space portion R' as indicated in FIG. 6A. As a consequence, the off timing of the analog switch $AS_1$ is determined so that the voltage level substantially at the center of the linear portion of the rising side of this signal is the held voltage level $V_H$ of the voltage holding unit 5b in the intersong servo unit 5. Thus, the linear portion of the rising side of the signal is utilized for the intersong servo region.

However, if there is a displacement between the intersong sensor 1 and the tip of the stylus, for example, in a manner such that the tip of the stylus is located at the position designated by X in FIG. 6A, even if the arm is controlled by the servo unit 5, the tip of the stylus will be brought into contact with the end portion of the previous song so that there is some possibility of playing the end portion of the previous song.

In such a case, it is advantageously convenient that the output signal level of the intersong sensor 1 applied to the non-inverting input of the differential amplifier 5c is lowered in magnitude corresponding to the differential between the held voltage level $V_H$ from the voltage holding unit 5b with respect to the central portion of the rising side of the signal from the sensor 1 and the voltage level produced with respect to the position of the tip of the stylus thus displaced in the intermediate space portion of the recording disc. Thus, the linear portion of the rising side of the signal from the sensor 1 may again be utilized for the intersong servo region and the differential amplifier 5c will again produce an output signal for correctly moving the tip of the stylus of corresponding to the central portion of the rising side of the signal from the sensor 1.

Figure 6B:
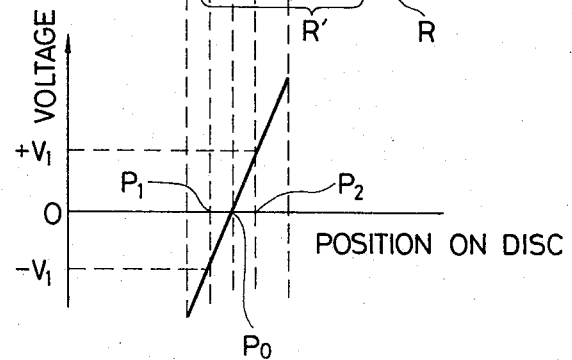

The above-described level shifting unit 5d is thus provided to shift the level of the output from the intersong sensor 1 corresponding to the excessive displacement of the tip of the stylus. This shift of the level of the output signal from the sensor 1 can be achieved by setting the movable contact of the variable resistor VR. More specifically, as indicated in FIG. 6B, if the tip of the stylus is displaced to the position $P_1$ corresponding to the point X on the rising side of the signal from the sensor 1 in FIG. 6A, there is applied to the non-inverting input of the operational amplifier OP4 a voltage $-V_1$ corresponding to the difference between the held voltage level $V_H$ and the output level of the signal from the sensor 1 at the point X, a zero voltage if the tip of the stylus is not displaced at the position $P_0$ and a signal $+V$ corresponding to the difference between the held voltage level $V_H$ and the output signal level of the sensor 1 when the tip of the stylus of the pickup cartridge is displaced to the position designated by $P_2$.

It is noted that the tip of the stylus is brought into contact with the disc at a position having a predetermined relationship with the position corresponding to the held level by the voltage holding unit 5b and is not always coincident thereto. Moreover, the level of the output signal from the intersong sensor 1 is shifted by the level shifting unit 5d so that the tip of the stylus of the pickup cartridge is brought into contact at the desired position on the recording disc.

It is noted that the foregoing description of the second embodiment is directed to an intersong servo unit in which the output signal level from the sensor 1 is shifted, and the level of a voltage held by the voltage holding unit 5b may also be shifted before comparison in the differential amplifier 5c so as to finely adjust the displacement of the stylus in the same manner as in the previous embodiment. It is further noted as indicated in FIG. 6A that, when the tip of the stylus is located at the point X, the held voltage level is shifted so that the tip of the stylus will be brought into contact with the recording disc in the vicinity of the position $P_0$.

It may be appreciated from the foregoing description that, since in the automatic music selecting device of the invention the level of the output signal from the intersong sensor is retained upon stopping of the arm and that the arm position is further finely adjusted on the basis of the difference between the signal level thus held and the output signal level thereafter produced from the sensor so as to maintain the arm positioned in a predetermined intermediate space between the previous song and a song to be next reproduced, the arm will be lowered to a predetermined intermediate position even if the disc is eccentric by finely adjusting the arm position so that the stylus will be lowered to the desired intermediate position. Also, the one level to be compared may be shifted for excessive displacement of the tip of the stylus of the pickup cartridge on the recording disc so as to electrically correct the displacement of the tip of the stylus with a simple apparatus without adjusting the position of the cartridge mechanically.

Figure 7A:
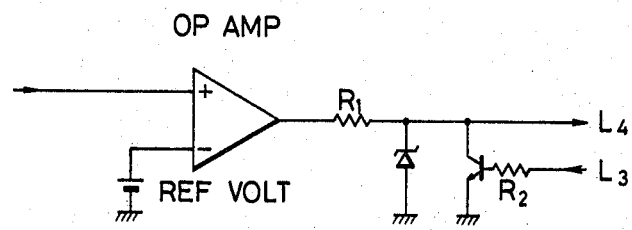
FIGS. 7A through 7C show detailed circuit diagrams of various of the components shown in FIG. 1.

A detailed circuit diagram of the signal processing unit 2 shown in FIG. 1 is illustrated in FIG. 7A. The output of the intermusic sensor 1 is applied to the non-inverting input terminal of an operational amplifier and a reference voltage is applied to the inverting input terminal thereof. The output of the operational amplifier is applied through a resistor $R_1$ to the signal processing unit 2 as the signal $L_4$. A zener diode is connected between one terminal of the resistor $R_1$ and ground. The signal $L_3$ is applied from the signal processing unit 4 to the base of an NPN transistor through a resistor $R_2$. When the transistor is rendered conductive in response to the signal $L_3$, then the output $L_4$ of the signal processing unit 2 is not delivered to the signal processing unit 4.

Figure 7B:
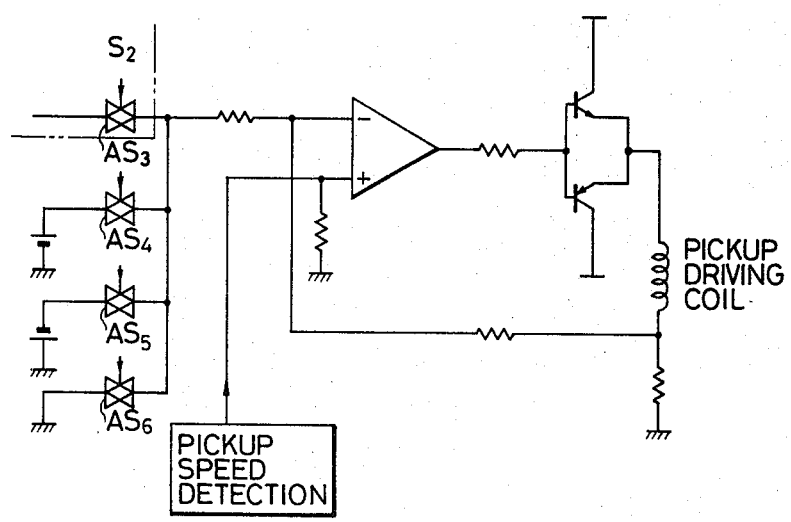
Figure 7C:
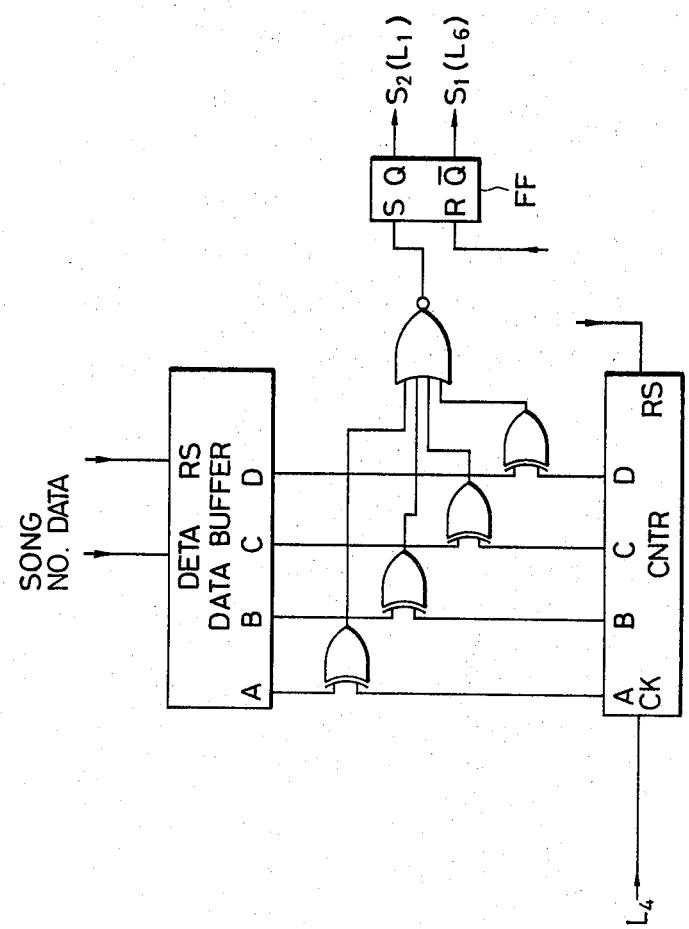

Detailed circuit diagram of the arm driving unit 3 and the logic control unit 4 are illustrated respectively in FIGS. 7B and 7C. When the pickup cartridge is placed on an arm rest, an analog switch $AS_6$ is rendered ON and reset signals are fed to reset terminals of both a data buffer circuit and a counter shown in FIG. 7C. When the user selects a particular number of a song and commands the commencement of the operation, the the data of the number of the designated song is latched in the data buffer circuit shown in FIG. 7C. An analog switch $AS_4$ is rendered ON when the pickup cartridge is instructed to implement the leading-in operation so that the output of the intersong sensor 1 produces the signal $L_4$ which is in turn applied to the clock terminal CK of the counter shown in FIG. 7C. As a result, the counter implements an incrementing operation and sets the flip-flop when the output of the counter is in coincidence with the preset data in the data buffer circuit. The output of the flip-flop is then applied to the intersong servo unit 5 to thereby cause the analog switch $AS_1$ to turn ON and the analog switch $AS_3$ to turn OFF. Thereafter, the pickup cartridge is lowered onto the disc and the reproducing operation of the designated music is commenced. At this time, an analog switch $AS_6$ is turned ON and the reset signals are applied to the reset terminals of the buffer circuit and the counter, and new data is fed to the data buffer circuit corresponding to a subsequent operation.

What is claimed is:
1. An automaic music selecting device comprising:
an intersong sensor mounted on a pickup cartridge mounted on an arm for detecting intervals between adjacent songs on a recording disc upon movement of said arm;
means responsive to a number on said recording disc of a song externally designated for stopping said arm at a predetermined interval between adjacent songs on said recording disc;
means for holding the level of an output signal from said intersong sensor before said arm is stopped; and means for finely adjusting the position of said arm on the basis of a difference between a level of the output signal thereafter produced from said sensor and the held level from said level holding means for disposing said arm in a predetermined intermediate position on said recording disc corresponding to said held level.

2. An automatic music selecting device comprising:

an intersong sensor mounted on a pickup cartridge mounted on an arm for detecting intervals between adjacent songs on a recording disc upon movement of said arm;

a control unit for stopping said arm at a predetermined interval between adjacent songs on said recording disc, said control unit comprising a data buffer for storing a number of a selected song; a counter operating in response to said intersong sensor for counting intersong intervals; coincidence circuit means operating in response to said data buffer and said counter for producing a coincidence signal when a counted value of said counter coincides with a song number stored in said data buffer; and a flip-flop the operational state of which is controlled in accordance with said coincidence signal, first and second control signals being produced on non-inverted and inverted outputs of said flip-flop;

an intersong servo unit, said intersong servo unit comprising a first buffer amplifier having an input coupled to receive an output from said intersong sensor; a first analog switch having a signal input coupled to an output of said first buffer amplifier and a control input coupled to receive said first control signal; a capacitor coupled between an output of said first analog switch and ground; a second analog switch having a signal input coupled to said output of said first analog switch and an output coupled to ground with a control input of said second analog switch being coupled to receive said first control signal; a second buffer amplifier having an input coupled to said output of said first analog switch, an operational amplifier having a non-inverting input coupled to said output of said first buffer amplifier and an inverting input coupled to an output of said second buffer amplifier; and a third analog switch having a signal input coupled to an output of said operational amplifier and a control input coupled to receive said second control signal; and an arm driving unit operating in response to an output signal produced at an output of said third analog switch of said intersong servo unit.

3. An automatic music selecting device comprising:

an intersong sensor mounted in the vicinity of a tip of a stylus of a pickup cartridge mounted on an arm for detecting predetermined intervals between adjacent songs on a recording disc upon movement of said arm;

means responsive to a number of song on said recording disc externally designated for stopping said arm at a predetermined intermediate interval between adjacent songs on said recording disc;

means responsive to an output signal level from said sensor for holding the level of an output signal from said intersong sensor before said arm is stopped;

means for finely adjusting the position of said arm on said recording disc on the basis of a comparison result between the held level from said level holding means and the level of said output signal thereafter produced from said sensor; and means for shifting the level of either signal compared in said adjusting means.

4. An automatic music selecting device comprising:

an intersong sensor mounted on a pickup cartridge mounted on an arm for detecting intervals between adjacent songs on a recording disc upon movement of said arm;

a control unit for stopping said arm at a predetermined interval between adjacent songs on said recording disc, said control unit comprising a data buffer for storing a number of a selected song; a counter operating in response to said intersong sensor for counting intersong intervals; coincidence circuit means operating in response to said data buffer and said counter for producing a coincidence signal when a counted value of said counter coincides with a song number stored in said data buffer; and a flip-flop the operational state of which is controlled in accordance with said coincidence signal, first and second control signals being produced on non-inverted and inverted outputs of said flip-flop;

an intersong servo unit, said intersong servo unit comprising a first buffer amplifier having an input coupled to receive an output of said intersong sensor; a first analog switch having a signal input coupled to an output of said first buffer amplifier and a signal input coupled to receive said first signal; a capacitor coupled between an output of said first analog switch and ground; a second analog switch having a signal input coupled to said output of said first analog switch and an output coupled to ground with a control input coupled to receive said first control signal; a second buffer amplifier having an input coupled to said output of said first analog switch; a first operational amplifier having an inverting input coupled to said output of said first buffer amplifier; a variable resistor having end contacts coupled to respective positive and negative voltage sources and a wiper contact coupled to a non-inverting input of said first differential amplifier; a second differential amplifier having a non-inverting input coupled to an output of said first operational amplifier and an inverting input coupled to an output of said second buffer amplifier; and a third analog switch having a signal input coupled to an output of said second operational amplifier and a control input coupled to receive said second control signal.

* * * * *